J. R. PARTINGTON, G. J. JONES AND T. K. BROWNSON.
PRODUCTION OF AMMONIUM NITRATE.
APPLICATION FILED DEC. 10, 1918.
1,330,136.
Patented Feb. 10, 1920.
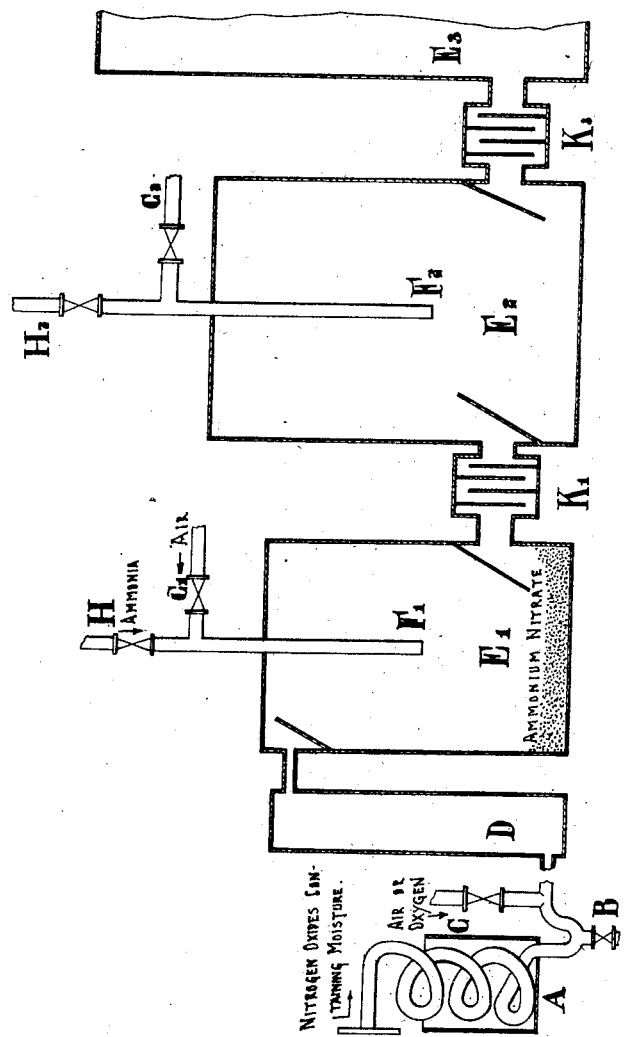
INVENTORS
J. R. Partington,
G. J. Jones.
T. K. Brownson.
BY
H. R. Kerslake ATTORNEY

UNITED STATES PATENT OFFICE.

JAMES RIDDICK PARTINGTON, GEORGE JOSEPH JONES, AND THOMAS KERFOOT BROWNSON, OF LONDON, ENGLAND.

PRODUCTION OF AMMONIUM NITRATE.

1,330,136. Specification of Letters Patent. Patented Feb. 10, 1920.

Application filed December 10, 1918. Serial No. 266,137.

*To all whom it may concern:*

Be it known that we, JAMES RIDDICK PARTINGTON, GEORGE JOSEPH JONES, and THOMAS KERFOOT BROWNSON, all residing at University College, Gower street, London, W. C. 1, England, have invented certain new and useful Improvements in and Relating to the Production of Ammonium Nitrate, of which the following is a specification.

This invention relates to the production of ammonium nitrate.

The usual methods of manufacturing ammonium nitrate comprise the neutralization of nitric acid by means of ammonia employed in the gaseous state or in the form of a solution, or the double decomposition of metallic nitrates such as sodium nitrate and calcium nitrate, with such ammonium salts as the sulfate or carbonate.

In the process of oxidizing ammonia generally used, the oxids of nitrogen obtained, namely nitric oxid (NO), nitrous anhydrid ($N_2O_3$) and nitrogen dioxid ($NO_2$ or $N_2O_4$), are caused to react with water in absorption towers in the presence of excess of oxygen usually added in the form of air, and dilute nitric acid is thereby obtained.

The acid obtained from these towers usually contains only 30% to 50% of nitric acid; and in commercial operations acid of more than 60% strength is not obtained. By neutralizing this acid with ammonia, a dilute solution of ammonium nitrate is obtained from which a considerable amount of water has to be driven off, and in the process of evaporation losses of ammonium nitrate occur.

The towers in which the absorption of the oxids of nitrogen by water is effected have to be very large and they are also very expensive.

We have found that it is possible to obtain solid ammonium nitrate of a satisfactory degree of purity direct, by bringing together oxids of nitrogen, oxygen, water and ammonia in suitable proportions.

The manufacture of ammonium nitrate in accordance with the present invention therefore broadly comprises bringing together oxids of nitrogen, oxygen, water and gaseous ammonia in proportions adapted to yield direct ammonium nitrate, in a solid state and of a satisfactory degree of purity.

The amount of oxygen which should be present in order to obtain the best results is in excess of that required to convert the whole of the oxids of nitrogen present into nitrogen dioxid.

In the case of gases containing about 10% by volume of oxids of nitrogen produced, for example, by the oxidation of ammonia, an amount of oxygen equal to three to four times that theoretically required to convert the whole of the oxids of nitrogen into nitrogen dioxid may be added. The proportion of excess oxygen is, it may be noted, dependent on the concentration of the oxids of nitrogen; thus the lower the content of oxids of nitrogen, the greater should be the proportion of excess oxygen. The oxygen required may be added in the form of oxygen gas, air or air enriched with oxygen.

The mixture of oxids of nitrogen and oxygen is allowed time in order that the reaction which may be represented by the equation:—

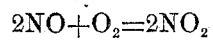

$$2NO + O_2 = 2NO_2$$

may be completed, as for instance by allowing the gases to pass through an empty tower or chamber of sufficient volume.

The water required for the reaction should be in a finely divided state, for instance as vapor, being, when necessary, added to the gases, for example as a spray, or in the form of steam or vapor.

The proportion of water present in the reaction mixture is as above indicated not in excess of that necessary to convert the whole of the oxids of nitrogen, when oxidized, into nitric acid, and is preferably sufficient only to convert the whole of the ammonia added into ammonium nitrate in accordance with the equation:—

$$4NH_3 + 2H_2O + 4NO_2 + O_2 = 4NH_4NO_3$$

If the addition of the ammonia is made in stages, and the ammonium nitrate produced in each removed, the requisite amount of moisture must be added before or simultaneously with the introduction of a fresh quantity of ammonia to the remaining gas.

The gases containing oxids of nitrogen may already contain a proportion of water. If this is greater than that which will enable the desired results to be obtained, water is abstracted from the gas, by, for instance, cooling the same; while if the proportion of water is too low, water is added.

Thus when employing gases obtained by oxidizing ammonia and containing about 10 per cent. by volume of oxids of nitrogen, these gases as they are produced will contain too much moisture for the purpose of the present invention, as may be seen from the following equation:—

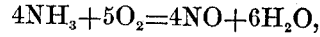
$$4NH_3 + 5O_2 = 4NO + 6H_2O,$$

and from the equation given above.

Such gases are therefore treated to remove a proportion of the water.

The reduction of the content of water can conveniently be effected by cooling the gases, in any suitable manner, to a temperature of say 20° or less, until the content of water has been reduced to the desired extent.

When gases obtained by denitrating spent acids, such as are produced, for instance, in the preparation of nitro bodies, by means of steam are employed, a similar procedure may be followed. While, if the oxids of nitrogen employed are produced in the manufacture of nitric acid by heating nitrates with sulfuric acid, water may be added to the gases as, for instance, in the form of steam.

The ammonia gas employed for the production of ammonium nitrate is also preferably admixed with oxygen which may be added to the ammonia in the form of oxygen gas, air or air enriched with oxygen. Thus, we may use a quantity of air, such as will produce a mixture of air, and ammonia containing 12 per cent. by volume of ammonia.

The quantity of ammonia brought together with the gases containing oxids of nitrogen should be insufficient to react with the whole of the oxids of nitrogen present, so that there are always present oxids of nitrogen and air or oxygen.

In order to illustrate a suitable proportionality between the oxids of nitrogen and ammonia for the production of the desired results, it may be stated that when gases obtained by the oxidation of ammonia and containing about 10 per cent. of oxids of nitrogen before the addition of the necessary air are employed, only about one-third of the amount of ammonia theoretically required to react with all the oxids of nitrogen is added.

Advantageously the mixture of ammonia and air or oxygen is introduced into the center of the chamber in which the admixture with the oxids of nitrogen takes place and the mixture of ammonia and air or oxygen or air enriched with oxygen is admitted at a high speed. In short, it is insured that the ammonia shall always meet with an excess of oxids of nitrogen. Further, the admixture must take place in a sufficiently large space; thus, in the case described as an example, sufficient space is allowed for the gas to remain in it during an interval of about two minutes.

In carrying out our invention we may use the apparatus shown in the figure. Oxids of nitrogen containing moisture, say from an ammonia oxidation converter, are passed through a cooler A, which may consist of a coil of acid resisting material cooled with water or by special refrigeration to the necessary temperature. The condensed moisture is removed through the valve B, and the gases containing the requisite degree of moisture pass to the oxidizing chamber or tower D. Before passing to this chamber or tower, additional air or oxygen is admitted as required, through the valve C. The fully oxidized gas leaving D is, if necessary, again cooled, and passes to the first reaction chamber $E_1$, being directed by suitable baffles before the entrance and exit for the gases, so as to pass uniformly through this chamber. Into any suitable part of the chamber, say into the center, as shown, we admit the mixture of air and ammonia through the tube $F^1$, the two gases being passed in suitable proportions through the valves $G_1$ and H.

Solid ammonium nitrate is deposited in the chamber $E_1$, and may be removed in any suitable manner. The solid carried over in the gas stream may be collected in the chambers $K_1$, provided with baffles.

The residual oxids of nitrogen then pass to the second reaction chamber $E_2$, where they are treated with a second quantity of ammonia through $F_2$, in the same manner as in $E_1$, the solid being again deposited.

This is repeated in successive chambers $E_2$, and $E_3$, etc., until the amount of oxids of nitrogen remaining is too small to be suitable for further treatment. The gas is then either rejected, or enriched with fresh oxids of nitrogen, or a portion of the gas may be rejected and the rest brought up to the requisite concentration by enrichment and also with the requisite amount of moisture, which may be introduced in the way previously described.

To allow sufficient time for the oxidation of the gases, which become more and more dilute as the reactions in the successive chambers occur, we may proportion the sizes of these chambers so as to allow sufficient time in each for the reoxidation to occur. We may also interpose between any two of the reaction chambers an empty chamber or tower to act as an oxidizing space similarly to $D_1$, in which the gases may remain for a sufficient length of time to become sufficiently oxidized. The sizes of these chambers and oxidizing spaces may be deduced from the known rate of oxidation of nitric oxid (NO) in the dilute state to nitrogen dioxid ($NO_2$) such for instance as is given in the experiments of Lunge and Berl (*Zeit. Angew. Chem.*, 20, 1716, 1907.)

Under these conditions we find that ammonium nitrate is produced in the form of a fine, pure and dry powder, which settles out and may be collected in chambers provided with baffles, or in any other suitable manner, and the last traces may be removed by filtration through screens of wire gauze made of metal unattacked by oxids of nitrogen, or in other ways, such as by electrical deposition. This powder, which is usually very voluminous at the instant of its deposition, becomes more compact on standing for a few hours. When the deposition takes place in the presence of the compact form of ammonium nitrate, the nitrate, however, separates out from the gases in a compact form. The oxids of nitrogen passing on may then be treated afresh in the manner described above, either directly or after enriching them with fresh oxids of nitrogen, or utilized in other ways, for instance, by absorption in water, concentrated sulfuric acid or alkali.

Working in this way we find that solid ammonium nitrate free from nitrite can be obtained, and the losses are less than those which attend any of the ordinary processes such as we have mentioned. In fact, we avoid the losses occurring in the nitric acid absorption towers, in the neutralization of the dilute nitric acid, and in the evaporation of the solution of ammonium nitrate, if the process of direct neutralization of tower acid is adopted; or the losses due to incomplete decomposition, to filtration, and evaporation when the methods of double decomposition are used.

Having now described our invention, what we claim as new and desire to secure by Letters Patent is:—

1. The process of producing ammonium nitrate which comprises bringing together oxids of nitrogen, oxygen, water and ammonia in such conditions that the proportion of oxygen present in the reaction mixture is in excess of that required on the basis of theory to convert the whole of the oxids of nitrogen into nitrogen dioxid, the proportion of ammonia is insufficient to react with the whole of the oxids of nitrogen and the proportion of water is not in excess of, and is preferably equal to, that which is sufficient to convert the whole of the ammonia into ammonium nitrate by interaction with the oxids of nitrogen and oxygen.

2. The process of producing ammonium nitrate as claimed in claim 1, in which gases containing about 10 per cent. of oxids of nitrogen are brought into the reaction system and in which oxygen is added to such gases in a proportion equivalent to three to four times that theoretically required to convert the whole of the oxds of nitrogen contained in the gases into nitrogen dioxid.

3. The process of producing ammonium nitrate as claimed in claim 1, in which the gases containing oxids of nitrogen brought into the reaction system are first mixed with an oxygen containing gas, and time is allowed for the oxygen to react with the oxids of nitrogen in order that the oxidation of such oxids may be completed prior to bringing these gases into association with ammonia and water.

4. The process of producing ammonium nitrate as claimed in claim 1, in which the ammonia gas prior to its introduction into the reaction system is mixed with oxygen or an oxygen containing gas.

5. The process of producing ammonium nitrate as claimed in claim 2, in which the proportion of oxids of nitrogen in the gases containing oxids of nitrogen prior to admixture of such gases with an oxygen containing gas, is 10 per cent., and in which only one-third of the amount of ammonia theoretically required to react with the whole of the oxids of nitrogen present, is added.

6. The process of producing ammonium nitrate as claimed in claim 1, in which the ammonia containing gas in introduced at high velocity into the center of the chamber in which the admixture with the oxids of nitrogen takes place.

7. The process of producing ammonium nitrate as claimed in claim 1, in which the gas remaining after any stage of the process and still containing oxids of nitrogen, is treated with a further quantity of moisture, oxygen, and ammonia in the manner described to produce a further quantity of ammonium nitrate.

In testimony whereof we have signed our names to this specification.

JAMES RIDDICK PARTINGTON.
GEORGE JOSEPH JONES.
THOMAS KERFOOT BROWNSON.